United States Patent
Ishiwa et al.

[11] Patent Number: 6,022,942
[45] Date of Patent: Feb. 8, 2000

[54] OPTICAL DATA STORAGE MEDIA

[75] Inventors: Kenichi Ishiwa, Oyama, Japan; Henricus H. M. van Hout, Halsteren, Netherlands; Ali Dhinojwala, Akron, Ohio; Niles R. Rosenquist, Vanderburgh, Ind.; Paul D. Sybert, Evansville, Ind.; Steven F. Hubbard, Mt. Vernon, Ind.; Paul C. Raymond, III, Tokyo, Japan; Joseph A. King, Jr., Midlothian, Va.; Gary C. Davis, Albany, N.Y.

[73] Assignee: General Electric Company, Schenectady, N.Y.

[21] Appl. No.: 09/225,413

[22] Filed: Jan. 5, 1999

Related U.S. Application Data

[60] Provisional application No. 60/070,473, Jan. 5, 1998.

[51] Int. Cl.[7] .................................................... C08G 64/00
[52] U.S. Cl. .......................... 528/196; 347/101; 347/150; 347/306; 430/200; 430/264; 503/201; 528/198
[58] Field of Search ............................. 528/196; 430/264, 430/200

[56] References Cited

U.S. PATENT DOCUMENTS

| | | | |
|---|---|---|---|
| 4,299,909 | 11/1981 | Imatomi et al. | 430/264 |
| 5,573,995 | 11/1996 | Janssens et al. | 503/201 |
| 5,621,449 | 4/1997 | Leenders et al. | 347/101 |

*Primary Examiner*—Terressa Mosley-Boykin

[57] ABSTRACT

There is provided herein an optical storage media which has low VBR. In a preferred embodiment, there is provided an optical disk comprising a genus of copolycarbonates, including copolyestercarbonates, which have excellent physical and optical properties. Said copolycarbonates have proportions of structural units which fall within a specific composition range, and said range defines certain materials, a large percentage of which can be molded into optical disks having the desired optical properties, including low VBR.

17 Claims, 1 Drawing Sheet

OPTICAL DATA STORAGE MEDIA

This application claims priority from Provisional Application No. 60/070,473, filed Jan. 5, 1998.

BACKGROUND OF THE INVENTION

This invention relates to optical data storage media, and more particularly, to optical disks having low vertical birefringence and excellent pit/groove replication by the substrate (e.g., a transparent thermoplastic) which supports the reflective layer.

Optical data storage media, including optical disks as exemplified by compact audio disks and CD-ROM disks used in computers, have become a popular means of storing large amounts of digital data. The data stored on an optical disk are read by a plane polarized laser beam and a polarization-sensitive detection scheme. Specifically, in compact disk and DVD technology, the laser beam is typically reflected off of a reflective metallic surface which is supported by polycarbonate within a spinning disk. The metallic surface has pits which corresponding to binary data, which are arranged within concentric grooves. The optical disk is "read" by analyzing the reflected laser light to determine whether it impacted a pit. It is necessary to minimize polarization-dependent effects on these laser beams which may be caused by passage through the polycarbonate because such effects will distort the reflected laser light, thus preventing accurate reading.

Polycarbonates are the most commonly employed polymers in optical disks. Polycarbonates are particularly suited for this purpose because they are transparent and they have favorable physical properties.

In the further development of optical disks, particularly read-write disks and disks capable of storing larger amounts of data, various physical factors become important. One such factor, which is closely related to the storage capacity of the disk, is birefringence, i.e., the difference between indices of refraction for light polarized in perpendicular directions. Birefringence leads to phase retardation between different polarization components of the laser beam (i.e., a polarization-dependent effect), thereby reducing readability of the disk.

Birefringence has several sources, including the chemical nature of the raw material from which the disk is fabricated, the degree of molecular orientation therein and thermal stresses in a fabricated plastic optical disk. The observed birefringence of a disk is therefore determined by the molecular structure, which determines the intrinsic birefringence, and the processing conditions, which can create thermal stresses and orientation of the polymer chains. Specifically, the observed birefringence is typically a function of the intrinsic birefringence plus the birefringence introduced upon molding articles such as optical disks. The observed birefringence of an optical disk is typically quantified using a measurement termed "vertical" birefringence, which is described more fully below.

It is known that polycarbonates made from bisphenol-A (i.e., 2,2-bis(4-hydroxyphenyl)propane) have high intrinsic birefringence. It is also known that homopolycarbonates comprising units derived from spiro(bis)indanes, especially 6,6'-dihydroxy-3,3,3',3'-tetramethyl-1,1'-spiro(bis)indane (hereinafter "SBI"), have negative intrinsic birefringences, owing to the relatively rigid molecular structure of the SBI unit and its conformation in said homocarbonates.

A class of copolycarbonates having low intrinsic birefringence is disclosed, for example, in U.S. Pat. No. 4,950,731. Said copolycarbonates comprise structural units derived from bisphenol A and SBI.

It is also known, however, that SBI polycarbonates are deficient in such areas as processability and ductility. One result is that molding of SBI polycarbonates, including both homopolycarbonates and copolycarbonates also containing bisphenol A units, induces severe stresses. This is particularly true of injection molding of optical disks, in which such stresses are magnified. Under such conditions, these stresses can cause significant observed birefringence in a disk, despite the low intrinsic birefringence of the SBI-containing polycarbonates.

As mentioned previously, the observed birefringence is typically quantified for an optical disk by measuring the "vertical" birefringence (hereinafter "VBR"), which is defined as the difference between the refractive indices for light polarized perpendicular to the plane and that polarized in the plane of the disk. High VBR is a problem often encountered in disks molded from SBI polycarbonates. SBI polycarbonates may also have unacceptably high glass transition temperatures above 200° C., and unacceptably high melt viscosities. VBR must be kept below a certain threshold to ensure proper reading of an optical storage media.

Japanese Kokai 4/345,616 discloses polyestercarbonates containing carbonate units derived from spiro(bis)indanes such as SBI and from bisphenols such as bisphenol A, and ester units derived from dicarboxylic acids such as sebacic acid and dodecanedioic acid (hereinafter "DDDA"). However, this patent does not discuss which types of such copolymers can be used to make an optical disk having acceptable pit/groove replication and low VBR.

It has been found, that the VBR's of disks molded from these copolyestercarbonates vary over a wide range, including VBR levels that are too high to allow accurate data reading. Moreover, the melt viscosities and glass transition temperatures of such copolyestercarbonates are often too high for complete mold filling when making optical disks. Also, the pits in the metallic surface may not be properly filled with the copolyestercarbonate. Any of these problems will prevent the manufacture of readable optical disks.

Optical disk grade polycarbonates can be prepared by conventional interfacial and melt polymerization methods as well as by redistribution as described, for example, in U.S. Pat. No. 5,414,057 and solid state polymerization.

It is of interest, in view of the above-mentioned deficiencies in prior art materials, to develop new methods of making optical disks having low VBR and excellent pit/groove replication.

SUMMARY OF THE INVENTION

As stated herein, the term substrate refers to a transparent material through which a laser beam is transmitted to read information. The term reflective layer refers to a reflective surface (typically a thin layer of metal) which is supported within the substrate and reflects the laser beam. The term optical data storage media refers to the combination of the substrate and the reflective surface.

There is provided herein an optical data storage media comprising a substrate which has low VBR. In a preferred embodiment, there is provided an optical disk having a substrate comprising a genus of copolycarbonates, including copolyestercarbonates, which have excellent physical and optical properties. Said copolycarbonates have proportions of structural units which fall within a specific composition range, and said range defines certain materials, a large percentage of which can be molded into optical disks having the desired optical properties, including low VBR.

Accordingly, the invention in one of its aspects is directed to a substrate having a vertical birefringence of less than $3.0 \times 10^{-4}$, which medium comprises a copolycarbonate having a glass transition temperatures less than 150° C., and more preferably less than 140° C., and an MVI value, as defined hereinafter, of at least 40 cc/10 min, and more preferably at least 50 cc/10 min. The copolycarbonate preferably comprises:

(A) less than 40 mole percent of structural units of the formula

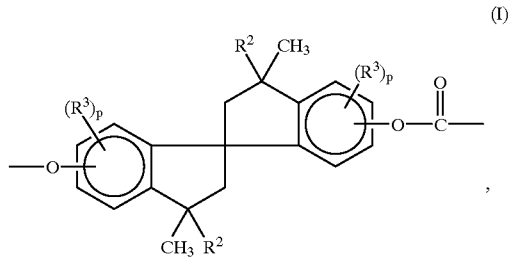

(I)

wherein $R^2$ is $C_{1-3}$, alkyl or phenyl, $R^3$ is $C_{1-3}$ alkyl and p is 1 or 2 (hereinafter "(A) units");

(B) about 50 to 85 mole percent of structural units of the formula

(II)

wherein $R^1$ is m-phenyleneoxy, an alkylene hydroxy acid or

(III)

and n is in the range of about 4–25 (hereinafter "(B) units"); and (C) a balance comprising structural units of the formula

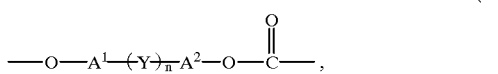

(IV)

wherein each of $A^1$ and $A^2$ is independently unsubstituted or substituted m- or p-phenylene, Y is a linking group wherein 1 or 2 atoms separate $A^1$ from $A^2$ and n is 0 or 1 (hereinafter "(C) units").

DETAILED DESCRIPTION OF THE PREFERRED EMBODIMENTS

Figure 1:
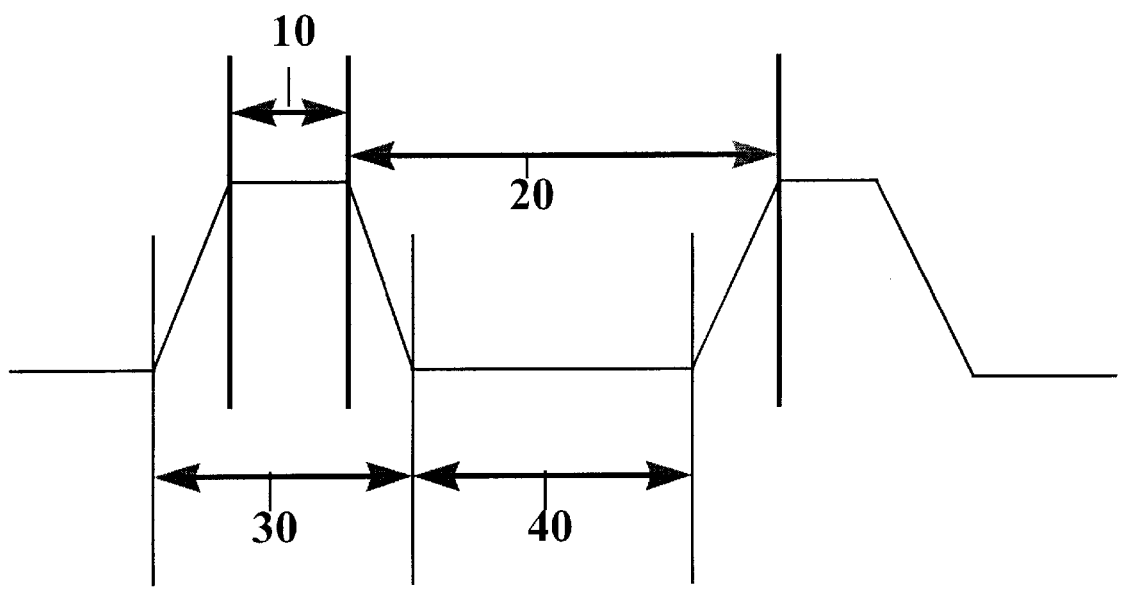
FIG. 1 depicts a profilometer scan across a sample optical disk having groove and land sections.

The optical disks described herein preferably have a VBR of less than $3.0 \times 10^{-4}$. The copolycarbonate which is molded to produce the optical disk has a glass transition temperature less then 150° C., more preferably less than 148° C., and an MVI of at least 40 cc/10 min. More preferably, the copolycarbonate has an MVI of at least 50 cc/10 min.

The copolycarbonates described herein comprise (A) units as described in the above Summary of the Invention. Said units are derived from SBI, its 5,5'-dihydroxy isomer or homologs thereof. In a preferred embodiment of the invention, the copolymer comprises less than 40 mole percent of the (A) units, and more preferably less than 30 mole percent of the (A) units as described in formula (I). The $R^2$ radicals in formula (I) may be $C_{1-3}$ alkyl or phenyl. Thus, the units of formula I may be derived from homologs formed from bisphenols other than bisphenol A, for example 2,2-bis(4-hydroxyphenyl)butane, 1,1-bis(4-hydroxyphenyl)-2-phenylethane, 2,2-bis(3-methyl-4-hydroxyphenyl)propane or 2,2-bis(3,5-dimethyl4-hydroxyphenyl)propane. Units derived from SBI and its 5-methyl homolog are preferred, with SBI being most preferred.

The copolycarbonates further comprise (B) units. These may be selected from the group consisting of resorcinol carbonate units, alkylene hydroxy acids and ester units containing a radical of formula III wherein n is in the range of about 4–25 and preferably about 6–18.

In addition, the copolycarbonate comprises (C) units, which are bisphenol carbonate units according to formula IV. The $A^1$ and $A^2$ variables in formula IV are m- or p-phenylene radicals which may be substituted, but are preferably unsubstituted. The Y variable in formula IV has one or two atoms, but preferably one, which separates $A^1$ from $A^2$. Y is usually a hydrocarbon radical such as methylene, isopropylidene or ethylene, but can it be a radical containing atoms other than carbon and hydrogen (e.g., substituted radicals such as 2,2-dichloroethylidene and hetero atom-containing radicals such as oxy, thio, sulfoxy and sulfone). The Y value may be present (n is 1) or absent (n is 0, whereupon the structural unit is derived from biphenyl). The preferred carbonate units of formula IV are bisphenol A carbonate units in which $A^1$ and $A^2$ are p-phenylene, and Y is isopropylidene.

Certain other copolycarbonates containing (A) and (C) units, as defined in the Summary, are also believed to possess advantageous processing and optical properties. For example, copolycarbonates comprising B units in which $R^1$ is an alkylene group, especially a $C_{4-25}$ alkylene group such as tetramethylene, hexamethylene, neopentylene or the alkylene group derived from glyceryl monostearate, are advantageous. Also monomer units having the formula

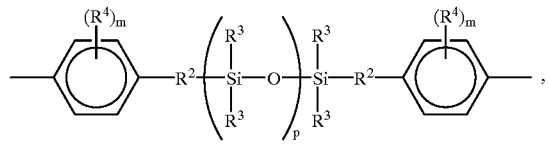

wherein $R^2$ is $C_{2-6}$ alkylene or O, $R^3$ is $C_{1-4}$ primary or secondary alkyl or fluoroalkyl or phenyl, $R^4$ is $C_{1-4}$ alkyl or alkoxy, m is 0–2 and p has an average value from 1 to 100, may be advantageously incorporated in the copolycarbonates. Among these latter radicals, the eugenol polydimethylsiloxane radicals in which $R^2$ is trimethylene, each $R^3$ is methyl, $R^4$ is methoxy and is located meta to the siloxy chain and m is 1, are especially preferred.

The copolycarbonates useful for the substrate must be moldable into optical disks having low VBR. Optical dsks molded from bisphenol A homopolycarbonates of comparable molecular weights typically have high VBR's.

Birefringence is typically measured using a linearly polarized laser and a modulating phase retarder. The retardation in the polarization produced by an optical disk is analyzed using a detection scheme consisting of a linear polarizer and a lock-in amplifier. The retardation for light normally incident on a disk and that when the laser is incident at a known (non-normal) angle are used to determine the VBR.

The copolycarbonates described herein have excellent physical properties including glass transition temperatures no higher than 150° C. and melt volume indices of at least 40 cc/10 min, and more preferably at least 50 cc/10 min, as determined by the aforementioned ASTM procedure under the conditions described. These physical properties make them easily processable. In particular, the copolycarbonates flow freely enough during processing to effectively fill pits and grooves in optical disk molds, thereby accurately replicating pits, grooves and lands in the disk being molded, thus enabling proper reading of the data.

Melt flow and melt volume parameters are related inversely to melt viscosity. They have values that can vary widely depending on the method of their determination. As used herein, the term "MVI" designates melt volume index as determined in an apparatus as described in ASTM procedure D1238 under the following conditions:

Sample weight—7 g;
Temperature—300° C.;
Weight—1.2 kg.

ASTM procedure D1238 is hereby incorporated by reference.

The described copolycarbonates are also required to have the prescribed glass transition temperatures, melt volume indices and VBR properties suitable to produce an optical disk which can be read accurately. Some polymers falling within the compositional ranges described in the Summary of the Invention may not possess the necessary physical properties. For example, high proportions of SBI units coupled with low proportions of B units, both within the prescribed ranges, may result in a polymer having a high glass transition temperature which places it outside the invention. However, in such a case, adjusting other parameters within their prescribed ranges, as disclosed herein, may produce a suitable copolymer.

As another example, the processing parameters of copolycarbonates and the VBR's of disks molded therefrom depend, to some extent, on their molecular weights. Thus, it is possible for copolycarbonates having the same proportions of structural units but different molecular weights to be suitable or unsuitable in terms of physical properties. Those skilled in the art will be able to determine optimum molecular weights by simple experimentation, and to produce copolycarbonates having said optimum molecular weights by art-recognized procedures. Such procedures may include, for example, variation of the proportion of endcapping agent such as phenol which is incorporated in an interfacial polycarbonate reaction mixture during the polymerization reaction.

The copolycarbonates must be thixotropic at shear rates from 10–100 sec$^{-1}$ at 250° C. That is, their viscosities are expected to decrease at increasing shear rates within this range, and also usually at higher shear rates. This allows molding the optical disk without increasing VBR above $3.0 \times 10^{-4}$.

The copolycarbonates of this invention may be prepared by conventional polycarbonate synthesis methods such as interfacial, transesterification and redistribution methods, or by solid state polymerization as described, for example, in U.S. Pat. Nos. 4,948,871, 5,204,377, 5,266,659 and 5,288,838, the disclosures of which are incorporated by reference herein. All of these methods are the subject of many issued patents and publications, and need not be described in detail herein. Ester units, such as those of formula II in which $R^1$ has formula III, may be incorporated in the polycarbonate by the use of a corresponding dicarboxylic acid or acid chloride in an interfacial procedure or the use of a dialkyl or diaryl, most often a diphenyl, ester of said acid in a melt or solid state procedure.

The optical information storage media of the invention include optical disks such as audio disks, laser disks, CD-ROM disks, DVD disks, rewritable and recordable CD and DVD formats, magneto-optical disks, and any other digital storage media wherein information is read via a laser.

Such media may be produced from the copolycarbonates of the invention by art-recognized means.

The preparation of the optical disks according to this invention is illustrated by the following examples. All percentages are by weight unless otherwise indicated. Molecular weights are weight average unless otherwise indicated and were determined by gel permeation chromatography relative to polystyrene.

EXAMPLE 1

Preparation of an Optical Disk

A 100-l stirred tank reactor was charged with 2720 g (8.820 moles) of SBI, 8418 g (36.873 moles) of bisphenol A, 761.7 g (3.308 moles) of dodecanedioic acid, 483.7 g (2.278 moles) of p-cumylphenol, 59 L of methylene chloride, 35 L of water, 334 g of 75% aqueous solution of tri-n-butylammonium chloride, and 0.9 g of 1-methylpiperdine. Phosgene, 3400 g (34.36 moles) was passed into a stirred mixture over 41 minutes and the pH was maintained between 8.0 and 9.0 by addition of 50% aqueous sodium hydroxide solution, after which an additional 2180 g (22 moles) of phosgene was added.

The organic solution was first diluted with 20 L of methylene chloride, then separated and washed twice. The product was steam-precipitated. The precipitated product was dried. The produce was the desired polyestercarbonate consisting of 18, 6.75, and 75.25 mole percent A, B, and C units respectively. The weight average molecular weight 17830 g/mol, and its glass-transition temperature was 140.1° C. Two optical disks were produced by extruding at 271° C. and injection molding at 330° C. and 320° C. (as indicated in data table), respectively.

You could also make an analogous copolymer by replacing the dodecanoic acid in the above preparation with an appropriate amount of resorcinol.

EXAMPLE 2

Preparation of Optical Disks

Various optical disks were prepared from different copolymers as described below in Table 1. The preparation described in Example 1 corresponds to sample 13.

The data in the columns of Table 1 labeled VBR 30 and VBR 40 correspond to VBR measurements taken 30 mm and 40 mm, respectively, the center of the optical disk. Different disks were made at injection temperatures of 330° C. and 320° C. to measure VBR.

TABLE 1

Various Optical Disks

| Sample Number | SBI mol % | BPA mol % | DDDA mol % | MW g/mol | MVI | Tg (° C.) | VBR30 330° C. | VBR40 330° C. | VBR30 320° C. | VBR40 320° C. | pit depth (nm) | pit shape |
|---|---|---|---|---|---|---|---|---|---|---|---|---|
| 1 | 26 | 67 | 7 | 16580 | 97 | 145.6 | 188 | 167 | 219 | 171 | 63.7 | slightly poor |
| 2 | 26 | 67 | 7 | 17997 | 62 | 147.5 | 230 | 184 | 225 | 218 | 67.9 | poor |
| 3 | 26 | 67 | 7 | 18000 | 35 | 152.9 | 316 | 270 | 270 | 290 | 65.5 | very poor |
| 4 | 18 | 79 | 3 | 20323 | 32 | 151.6 | 353 | 311 | 320 | 358 | 66.9 | slightly poor |
| 5 | 18 | 79 | 3 | 15778 | 88 | 148 | 266 | 209 | 282 | 264 | 65 | same |
| 6 | 14 | 73.5 | 12.5 | 17578 | 115 | 120.8 | | | 231 | 208 | | |
| 7 | 26 | 62 | 12 | 22169 | 52 | 135.6 | 190 | 140 | | | | |
| 8 | 26 | 62 | 12 | 27097 | 25 | 139.8 | 241 | 203 | | | | |
| 9 | 14.6 | 74.6 | 10.8 | 16890 | 145 | 124.9 | | | 283 | 245 | | |
| 10 | 18 | 75.25 | 6.75 | 24855 | 19.4 | 143.6 | 336 | 339 | | | 64.5 | very poor |
| 11 | 18 | 75.25 | 6.75 | 22251 | 38.1 | 142.7 | 287 | 276 | | | 64.2 | poor |
| 12 | 18 | 75.25 | 6.75 | 20209 | 52 | 142.2 | 246 | 248 | | | | |
| 13 | 18 | 75.25 | 6.75 | 17830 | 83 | 140.1 | 251 | 238 | | | | |
| 14 | 18 | 75.25 | 6.75 | 17123 | 111 | 139.9 | 225 | 236 | | | | |
| 15 | 18 | 75.25 | 6.75 | 16109 | 153 | 137.5 | 220 | 208 | | | 66.3 | same |
| C | 0 | 100 | 0 | | | | 333 | 311 | | | 66 | control |

EXAMPLE 3

Pit/Groove Replication

Several of the samples optical disks prepared in Example 2 were tested to determine whether they yielded adequate pit/groove replication to provide accurate data reading from the disk. The following procedure was used to measure pit/groove replication.

An Atomic Force microscope (AFM) was used to scan the surface of the optical disks. The depth of pits did not vary significantly, but the widths of pits and grooves varied with composition and Tg. The surface of the disk consisted of land regions and groove regions as shown in FIG. 1. The width of the flat areas at the land tops 10 and land bottoms 30 were compared with those of a polycarbonate disk molded using the same stamper. The groove tops 20 and groove bottoms 40 were similarly compared. To have acceptable pit/groove replication, all values for land and groove tops and bottoms must be within 30%, and more preferably 25% of the values for the control polycarbonate disk molded from the same stamper. Acceptable pit/groove replication will enable proper reading of the optical disk. Based on the 25% criterion, samples 2, 3, 4, 5, 10 and 12 exhibited inadequate pit/groove replication.

TABLE 2

Ratios of land/groove widths with disks molded from polycarbonate

| Sample Number | Land Top | Land Bottom | Groove Bottom | Groove Top |
|---|---|---|---|---|
| C | 1.00 | 1.00 | 1.00 | 1.00 |
| 1 | 0.88 | 1.02 | 1.00 | 1.10 |
| 2 | 0.72 | 0.99 | 0.97 | 1.11 |
| 3 | 0.70 | 1.03 | 0.98 | 1.09 |
| 4 | 0.67 | 1.04 | 0.92 | 1.09 |
| 5 | 0.60 | 0.98 | 0.95 | 1.11 |
| 10 | 0.82 | 1.48 | 0.50 | 1.12 |
| 11 | 0.87 | 1.24 | 0.69 | 1.07 |
| 15 | 0.90 | 1.05 | 0.97 | 1.08 |
| 13 | 0.79 | 1.06 | 0.92 | 1.12 |

Although the present invention has been described in considerable detail with reference to certain preferred versions thereof, other versions are possible. For example, the low birefringence copolycarbonates described herein could advantageously be used in all types of typical applications for polycarbonate, particularly those where low birefringence and/or a low particulate count provides some advantage. Specifically, the copolycarbonates described herein may be used in films for optical media, near field optical recording applications, ophthalmic lens applications, lenses for laser applications, cameras and imaging, liquid crystal substrates, visors, aircraft canopies, glazing, display screens, in-mold decorated parts, waveguides (e.g., core and/or cladding for single and multimode optical fibers, slab or channel waveguides, and lightpipes), and active photonic devices such as modulators (e.g., electro-optic or acousto-optic). Moreover, the copolycarbonates described herein may be used to make articles by injection molding, fiber spinning, extrusion, solution casting, and any other manufacturing method compatible with polycarbonates. It should also be noted that various types of additives which are known to be compatible with polycarbonate (e.g., polytetrafluoroethylene) could be incorporated in the polycarbonate. Also, known mold release agents and thermal stabilizers are commonly included in optical disk resins. Therefore, the spirit and scope of the appended claims should not be limited to the description of the preferred embodiments contained herein.

What is claimed is:

1. An optical data storage medium having a substrate with a vertical birefringence less than $3.0 \times 10^{-4}$, said substrate comprising a copolycarbonate having a glass transition temperature less than 150° C. and an MVI of at least 40 cc/10 min, said copolycarbonate comprising:

(A) less than 40 mole percent of structural units of the formula

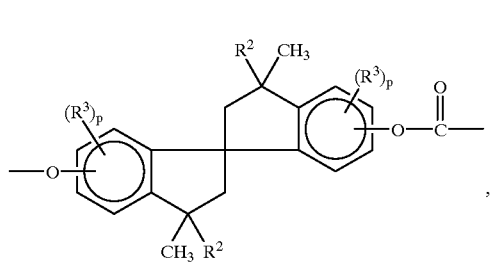

wherein $R^2$ is $C_{1-3}$ alkyl or phenyl, $R^3$ is $C_{1-3}$ alkyl and p is 1 or 2;

(B) about 50–85 mole percent of structural units of the formula

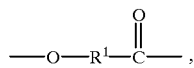

wherein $R^1$ is m-phenyleneoxy, an alkylene hydroxy acid or

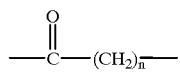

and n is in the range of about 4–25; and (C) a balance comprising structural units of the formula

wherein each of $A^1$ and $A^2$ is independently unsubstituted or substituted m- or p-phenylene, Y is a linking group wherein 1 or 2 atoms separate $A^1$ from $A^2$ and n is 0 or 1.

2. The optical data storage medium according to claim 1, wherein said storage medium is an optical disk.

3. The optical disk according to claim 2, wherein the copolycarbonate has acceptable pit/groove replication.

4. The optical disk according to claim 3, wherein $R^2$ is methyl and p is 0.

5. The optical disk according to claim 4, wherein each of $A^1$ and $A^2$ is a p-phenylene and Y is isopropylidene.

6. The optical disk according to claim 4, wherein the copolycarbonate is thixotropic at shear rates from 10–100 sec$^{-1}$ at 250° C.

7. The optical disk according to claim 5, wherein $R^1$ is m-phenyleneoxy.

8. The optical disk according to claim 5, wherein $R^1$ has formula III.

9. The optical disk according to claim 8, wherein n is from 6–18.

10. The optical disk according to claim 9 wherein n is 8 to 10.

11. The optical disk according to claim 5, wherein the units of the formula (1) have the formula:

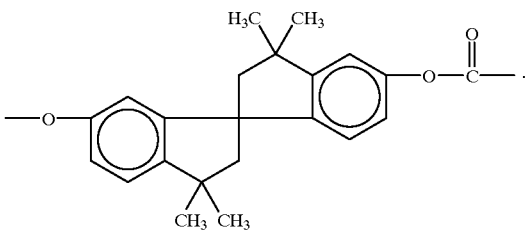

12. The optical disk according to claim 3, wherein the copolycarbonate is prepared using a synthesis technique selected from the group consisting of interfacial polymerization, transesterification, redistribution and solid state polymerization.

13. A method of making an optical data storage medium which comprises molding a copolycarbonate comprising:

(A) less than 40 mole percent of structural units of the formula

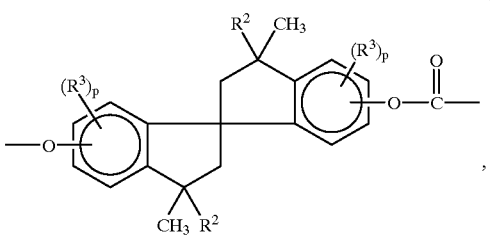

wherein $R^2$ is $C_{1-3}$ alkyl or phenyl, $R^3$ is $C_{1-3}$ alkyl and p is 1 or 2;

(B) about 50–85 mole percent of structural units of the formula

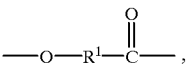

wherein $R^1$ is m-phenyleneoxy, an alkylene hydroxy acid or

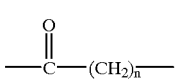

and n is in the range of about 4–25; and (C) a balance comprising structural units of the formula

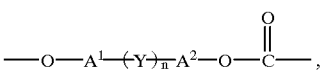

wherein each of $A^1$ and $A^2$ is independently unsubstituted or substituted m- or p-phenylene, Y is a linking group wherein 1 or 2 atoms separate $A^1$ from $A^2$ and n is 0 or 1.

14. The method according to claim 13, wherein the optical storage medium is an optical disk.

15. The method according to claim 14, wherein the optical disk has an acceptable pit/groove replication.

16. A copolycarbonate comprising:

(A) less than 40 mole percent of structural units of the formula

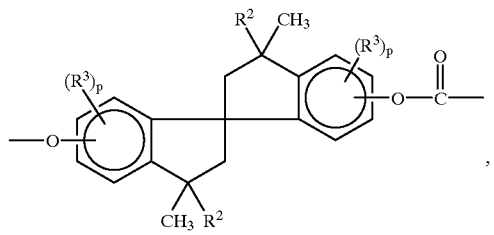

wherein $R^2$ is $C_{1-3}$ alkyl or phenyl, $R^3$ is $C_{1-3}$ alkyl and p is 1 or 2;

(B) about 50–85 mole percent of structural units of the formula

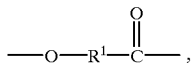

wherein $R^1$ is m-phenyleneoxy and (C) a balance comprising structural units of the formula

wherein each of $A^1$ and $A^2$ is independently unsubstituted or substituted m- or p-phenylene, Y is a linking group wherein 1 or 2 atoms separate $A^1$ from $A^2$ and n is 0 or 1.

17. An optical data storage medium comprising the copolycarbonate according to claim 16.

* * * * *